(12) United States Patent
Turbell et al.

(10) Patent No.: US 12,184,916 B2
(45) Date of Patent: Dec. 31, 2024

(54) IMAGE SECURITY USING SEGMENTATION

(71) Applicant: Microsoft Technology Licensing, LLC, Redmond, WA (US)

(72) Inventors: Henrik Valdemar Turbell, Redmond, WA (US); David Yuheng Zhao, Redmond, WA (US); Qingfen Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/020,889

(22) PCT Filed: Aug. 19, 2021

(86) PCT No.: PCT/US2021/046608
§ 371 (c)(1),
(2) Date: Feb. 10, 2023

(87) PCT Pub. No.: WO2022/066326
PCT Pub. Date: Mar. 31, 2022

(65) Prior Publication Data
US 2023/0308699 A1 Sep. 28, 2023

(30) Foreign Application Priority Data
Sep. 25, 2020 (LU) .................... LU102082

(51) Int. Cl.
*H04N 7/173* (2011.01)
*G06T 7/194* (2017.01)
(Continued)

(52) U.S. Cl.
CPC ....... *H04N 21/25816* (2013.01); *G06T 7/194* (2017.01); *H04N 7/15* (2013.01); *H04N 23/61* (2023.01)

(58) Field of Classification Search
CPC .... H04N 21/25816; H04N 7/15; H04N 23/61; H04N 21/4223; H04N 21/4415;
(Continued)

(56) References Cited

U.S. PATENT DOCUMENTS 8,339,418 B1 * 12/2012 Nesmith ................ G06T 15/50
345/633
9,396,537 B2 7/2016 Hirvonen
(Continued)

FOREIGN PATENT DOCUMENTS

| CN | 110127479 A | 8/2019 |
| CN | 111062273 A | 4/2020 |
| WO | 2017139325 A1 | 8/2017 |

OTHER PUBLICATIONS

"BioID Face Liveness Detection", Retrieved From: https://web.archive.org/web/20191130024055/https:/www.bioid.com/liveness-detection/, Nov. 30, 2019, 9 Pages.
(Continued)

*Primary Examiner* — Annan Q Shang
(74) *Attorney, Agent, or Firm* — Schwegman Lundberg & Woessner, P.A.

(57) ABSTRACT

Systems and methods may be used for access control. These systems and methods may include using a data processing system to access a video stream, the video stream including an image including a virtual background, segmenting the image into a foreground portion and a background portion to determine whether the foreground portion or the background portion of the image meets a threshold requirement, and outputting an alert in response to determining that the foreground portion or the background portion of the image fails to meet the threshold requirement.

20 Claims, 7 Drawing Sheets

(51) Int. Cl.
*H04N 7/15* (2006.01)
*H04N 21/258* (2011.01)
*H04N 23/61* (2023.01)

(58) Field of Classification Search
CPC .......... H04N 21/44236; H04N 21/2187; G06T 7/194; G06T 2207/30232
See application file for complete search history.

(56) References Cited

U.S. PATENT DOCUMENTS

| | | | |
|---|---|---|---|
| 9,503,687 | B2 | 11/2016 | Kratz et al. |
| 9,818,023 | B2 | 11/2017 | Shor et al. |
| 9,992,450 | B1 | 6/2018 | Yuan et al. |
| 10,084,920 | B1 | 9/2018 | Gainsboro et al. |
| 10,108,871 | B2 | 10/2018 | Derakhshani et al. |
| 10,110,324 | B2* | 10/2018 | McCormack ........... H04W 4/80 |
| 10,110,583 | B1* | 10/2018 | Krstic ................... H04L 63/105 |
| 10,404,924 | B2 | 9/2019 | Breuer et al. |
| 10,657,401 | B2 | 5/2020 | Agrawal et al. |
| 11,172,251 | B1* | 11/2021 | Thomas ................. H04N 7/152 |
| 2005/0196023 | A1 | 9/2005 | Chen |
| 2010/0293600 | A1* | 11/2010 | Schechter ............. H04L 63/083 |
| | | | 726/4 |
| 2011/0069940 | A1* | 3/2011 | Shimy ................ H04N 21/4532 |
| | | | 386/296 |
| 2013/0335535 | A1 | 12/2013 | Kane et al. |
| 2015/0070516 | A1* | 3/2015 | Shoemake ......... H04N 21/4542 |
| | | | 348/207.11 |
| 2015/0186711 | A1 | 7/2015 | Baldwin et al. |
| 2016/0188585 | A1* | 6/2016 | Durham ............... H04N 13/351 |
| | | | 345/633 |
| 2017/0124413 | A1 | 5/2017 | Deng |
| 2018/0068334 | A1* | 3/2018 | Alomar ............. G06Q 30/0209 |
| 2018/0197294 | A1 | 7/2018 | Pan et al. |
| 2020/0059703 | A1* | 2/2020 | Sonare ............. H04N 21/23418 |
| 2020/0301646 | A1* | 9/2020 | Aoki ..................... G06F 16/162 |
| 2022/0070389 | A1* | 3/2022 | Tangeland ................ G06T 5/90 |

OTHER PUBLICATIONS

"FaceMe® The World's Top Cross-Platform AI Facial Recognition Engine", Retrieved from: https://web.archive.org/web/20200620085504/https://www.cyberlink.com/stat/technology/enu/tech_face.jsp, May 20, 2020, 11 Pages.

Bazarevsky, Valentin, "Mobile Real-time Video Segmentation", Retrieved From: https://ai.googleblog.com/2018/03/mobile-real-time-video-segmentation.html, Mar. 1, 2018, 6 Pages.

Chen, et al., "Live Video Forensics: Source Identification in Lossy Wireless Networks", In Journal of IEEE Transactions on Information Forensics and Security, vol. 10, Issue 1, Jan. 2015, pp. 28-39.

Kim, et al., "A Motion and Similarity-based Fake Detection Method for Biometric Face Recognition Systems", In Proceeding of IEEE International Conference on Consumer Electronics, vol. 57, Issue 2, May 1, 2011, pp. 756-762.

"Search Report Issued in Luxembourg Patent Application No. LU102082", Mailed Date: May 26, 2021, 11 Pages.

Moshnyaga, et al., "Applying user Monitoring for Display Power Management", In Proceeding of ICROS—SICE International Joint Conference, Aug. 18, 2009, pp. 3599-3604.

"International Search Report and Written Opinion Issued in PCT Application No. PCT/US21/046608", Mailed Date: Dec. 1, 2021, 15 Pages.

Stauffer, et al., "Adaptive background mixture models for real-time tracking", In Proceedings of Computer Society Conference on Computer Vision and Pattern Recognition, Jun. 23, 1999, pp. 246-252.

Communication Pursuant to Article 94(3) EPC, Received in European Application No. 21766081.0, Mailed on Jun. 26, 2024, 05 Pages.

Office Action Received for Chinese Application No. 202180065087.9, mailed on Sep. 21, 2024, 13 pages. (English Translation Provided).

* cited by examiner

IMAGE SECURITY USING SEGMENTATION

CLAIM FOR PRIORITY

This application is a U.S. National Stage Filing under 35 U.S.C. 371 of International Patent Application Serial No. PCT/US2021/046608, filed Aug. 19, 2021, and published as WO 2022/066326 A1 on Mar. 31, 2022, which application claims the benefit of priority to Luxembourg Patent Application No. LU102082, filed Sep. 25, 2020, which applications and publication are hereby incorporated herein by reference in their entirety.

BACKGROUND

Security needs are constantly evolving. Whether due to increases in data or granularity needs, or physical security needs, access authorization is an important component of security. Physical barriers (e.g., locked doors), user names, passwords, and keycodes are used to varying degree of success at preventing security breaches. Attempts to evade or override these security measures may result in unauthorized access to data or physical spaces.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for providing access control via security systems are described herein. Access to digital or physical resources may be controlled by the security techniques and systems described herein. For example, digital access may be controlled to data, a service, an application, a live online event, or the like. Physical access may be controlled to a space, a room, a building, a file cabinet, a safe, or the like. In some examples, access may be controlled to a combination of digital and physical assets, such as physical access to a computer and digital access to data on the computer.

In an example, these systems and methods may be used to determine whether a live person is in a video or image submitted for access. For example, the systems and methods described herein may determine whether a video stream is live or pre-recorded. In another example, the systems and methods described herein may determine whether a foreground (e.g., including a person) is present within an image. In various examples, an alert may be provided indicating that an unauthorized access attempt has occurred.

In an example, systems and methods described herein may be used to prevent access to a controlled asset when the access attempt is unauthorized. Various actions may be performed automatically in response to detecting an unauthorized access attempt. For example, an automatic action may include an automated phone call, an automated text message, an automated email message, blocking incoming video at a user device, blocking outgoing video at a user device, prohibiting a voting input from a user device, preventing access to a secure physical location, preventing access to secure digital information, terminating access to secure digital information, rendering a different set of information for display, requiring additional information (e.g., a password to be entered), or the like.

The systems and methods described herein solve technical problems related to security verification, including detecting unauthorized access to secured information or a secured location. Access control and security are critical to modern infrastructure, and attempts are constantly made to circumvent current security measures. Some circumvention actions rely on manipulating a video stream or captured image. One example technical solution described herein provides for determining whether a video stream is pre-recorded or live based on identifying a source type of the video stream. Another example technical solution described herein provides a technique for determining whether a foreground portion of an image satisfies a threshold requirement based on a segmentation of the image or a portion of the image.

Figure 1:
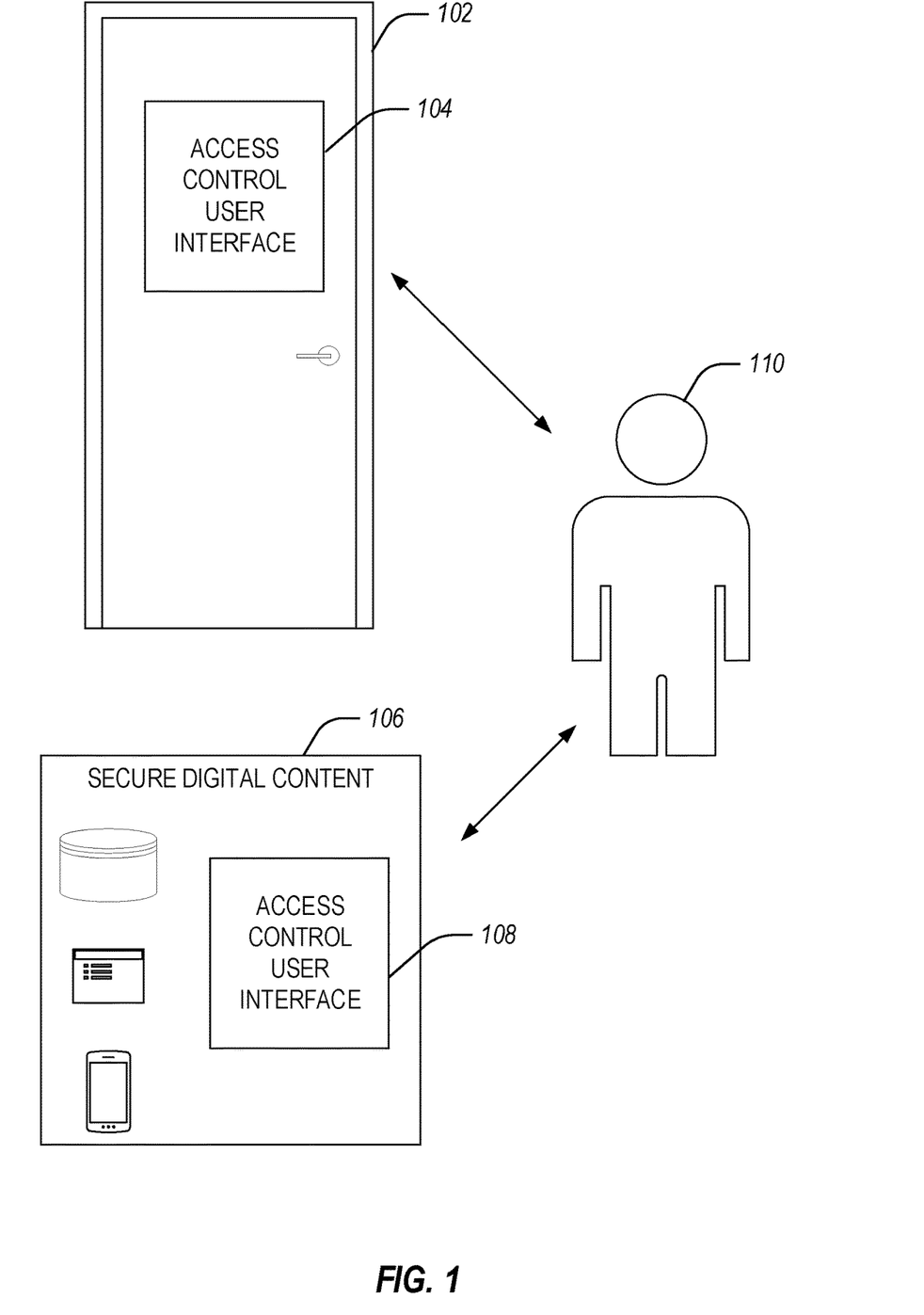
FIG. 1 illustrates example access control systems according to some examples of the present disclosure.

FIG. 1 illustrates example access control systems 104 and 108 according to some examples of the present disclosure. The access control system 104 is used for security of a physical asset 102 (e.g., a door, a room, a safe, a file cabinet, a building, or the like) and the access control system 108 is used for security of a digital asset 106 (e.g., data, a service, an application, a live online event, a video conference, or the like). A user 110 may attempt to access the digital asset 106 or the physical asset 102. In an example, the user 110 may attempt to circumvent the access control of the systems 104 or 108.

A security system, such as access control systems 104 or 108 may use the security techniques described herein to prevent unauthorized access to the physical asset 102 or the digital asset 106, respectively. Security techniques may include determining whether a video stream is pre-recorded or live based on identifying a source type of the video stream or determining whether a foreground portion of an image satisfies a threshold requirement based on a segmentation of the image or a portion of the image.

In an example, a video stream or image is used to verify an identity of the user 110 to permit access, when authorized. The video stream or image may be used to verify that the user 110 is present, is a particular person, is performing a gesture, or the like. However, the video stream or image may be corrupted by an unauthorized user. For example, the user 110 may pre-record video and submit the pre-recorded video in place of live video. In this example, the unauthorized attempted access may be identified based on a source type of the pre-recorded video (e.g., not a camera or hardware component, but instead a video file, application source, or software component). In another example, the video stream or image may include a background portion of the image that appears to include the user 110. This background portion may replace the entirety or most of the video stream or image with the user 110 appearing to be present. In this way, the user 110 may appear to be in a live video or image with a replaced background, such as in a live video conferencing session, but may be missing from a foreground portion of the video stream or image.

Figure 2:
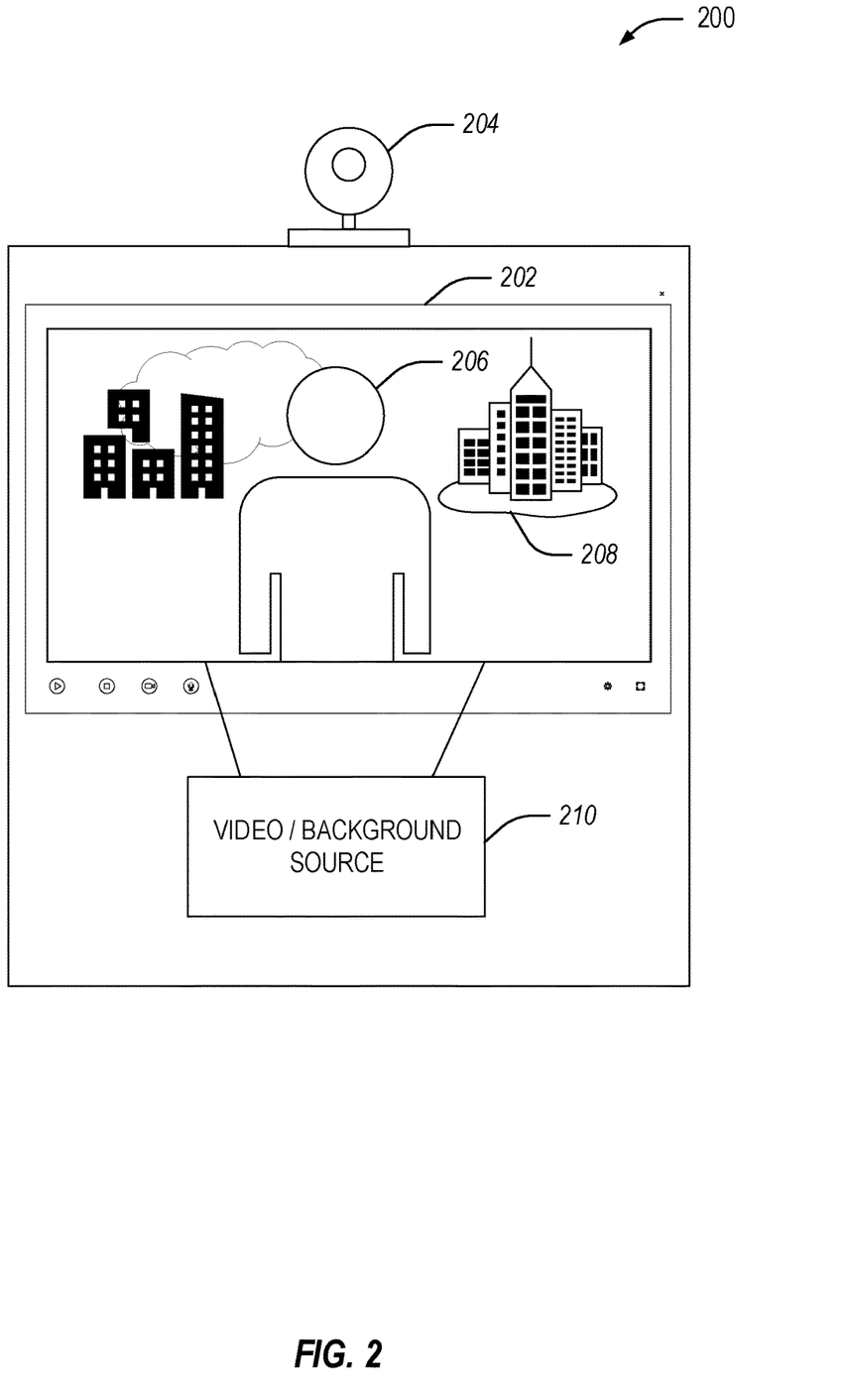
FIG. 2 illustrates an access control device and user interface according to some examples of the present disclosure.

FIG. 2 illustrates an access control device 200 with a user interface 202 according to some examples of the present disclosure. The access control device 200 may include or be communicatively coupled to a camera 204. The access control device 200 may store or have access to a video or background source 210 (e.g., video or an image stored on a storage device, such as a database, long term memory, short term memory, etc.). The camera 204 may be used to capture video or an image.

The user interface 202 shows an image (which may be an image of a video stream) of a user 206 (who may be in a foreground or background portion of the image), and a reference image 208 that is part of a virtual background. In a case where the user 206 is engaging in authorized use or access, the user 206 is in a foreground portion of the image, and the image or video stream is captured and output live by the camera 204. In an unauthorized use or access case, the user 206 is in a background portion of the image or the image is pre-recorded (including optionally being pre-recorded by the camera 204, but not live). In the unauthorized use or access case, a pre-recorded video may be accessed from the video or background source 210 to supplant or replace a live image or video stream from the camera 204. The pre-recorded video in the unauthorized use or access case may be used as a virtual background replacing a background of a live image or video captured by the camera 204.

In an example scenario, a student participating in a live video conferencing session may be the user 206. The unauthorized use or access includes the student attempting to skip an on-line lesson or test without the teacher noticing. The student may pre-record a video including a representation as the user 206, and inject the pre-recorded video into a later live video conferencing session, either replacing a live feed from the camera 204 or as a virtual background. In the virtual background example, the user may point the camera 204 at a wall or any background that does not feature movement, a person, an animal, or other foreground object. In this example, the virtual background replaces all or substantially all of the live video stream, making it appear to a viewer of the live video conferencing session that the user 206 is in the image, although the user 206 is not present.

This unauthorized use or access may be detected based on a source type of the video stream (e.g., a virtual webcam appears in a list of devices, a connection port is identified, a flag is included in the video stream metadata, or the like) or based on a segmentation of an image of the video stream. The techniques to detect the unauthorized use or access may be run together, in parallel or serially, or separately. A video conferencing application may perform one or more of the techniques.

After an unauthorized use or access is detected, an alert may be issued (e.g., in the example above, to the teacher). For example, a video conferencing application may flag the video stream as likely compromised or untrustworthy, such as on a receiver device. The flagging may, for example, be a warning triangle icon with an explaining tool-tip text or a pop-up next to the video stream appearing on the receiver device.

In another example, an unauthorized use or access may be detected based on segmentation. A background replacement feature is used in many live video conferencing applications, which allows a user to select an image or video as the background. An AI-driven segmentation algorithm, for example in a separate stand-alone security application or in the native live video conferencing application may analyze an image (e.g., a frame of a video stream) to look for a live person. A foreground portion and a background portion are segmented, and compared to a threshold requirement. The threshold requirement may include a requirement that a minimum percentage of pixels or area of the image be in the foreground portion or a maximum percentage of pixels or area of the image be in the background portion. In another example, the threshold requirement may require that a foreground be present, or have a minimum percentage or number of pixels or area in a particular portion of the image (e.g., in a central portion of the image, such as a middle third of the image).

Segmentation may be done by a deep neural network, in an example. An example algorithm takes a color image as input and outputs a black and white segmentation mask of at the same resolution. Each pixel is classified as either foreground or background. The foreground is composited on top of the background image.

Returning to the student example, the student may fake the presence of the user 206 by pre-recording a photo or video to use as a virtual background. The virtual background is then used to replace an entirety of captured video by pointing the camera 204 to an empty area, such as a wall. In this example, the segmentation technique may be used to determine that no foreground or substantially no foreground (e.g., 90% percent background) is present in an image of output video, or for example, when the segmentation mask is empty or substantially empty.

When the segmentation technique detects the threshold requirement has failed to be met, an alert may be output or another mitigation action may be automatically enacted. For example, a flag or alert may indicate that no person is detected by the segmentation algorithm. The flag or alert may be sent to the teacher's user interface. A mitigation action may include an action by a host configured automated service, which may be personalized to a host or include default settings. In an example, the host configured automated service may include an automated phone call, an automated text message, or an automated email message (e.g., to a security personnel, to a teacher, to a boss, to a parent, to the user 206, to a student, etc.). The host configured automated service may include blocking incoming video at the access control device 200 (which may include a user device of the user 206 or a security device used by the user 206 to attempt the unauthorized access). In an example, the host configured automated service may include blocking outgoing video (e.g., blocking video from leaving the access control device 200) or blocking other output from the access control device 200 (e.g., to prevent further attacks). In some examples, the host configured automated service may include prohibiting a voting input from the user 206, for example by blocking a voting component on the access control device 200 or blocking credentials of the user 206.

In cases of unauthorized attempts to access a physical resource, the host configured automated service may include preventing access to a secure physical location (e.g., a room, a building, a file cabinet, a safe, a cubby, a locker, a vehicle, a garage, etc.), blocking access (e.g., physically, such as with a door or covering) to the access control device 200 entirely or to portions of the access control device 200, or revoking access to a secure physical location. The user 206 may be physically prevented from entering or engaging the secure physical resource, or may be prevented from using or accessing the secure physical resource (e.g., starting a vehicle). In cases of unauthorized attempts to access a digital resource, the host configured automated service may include preventing access to secure digital information, terminating access to secure digital information, rendering a different set of information for display, or the like. In either physical or digital resource example, the host configured automated service may include requiring additional information, such as a password, a two-factor authentication, a one-time code, restarting a security protocol, or the like.

Figure 3:
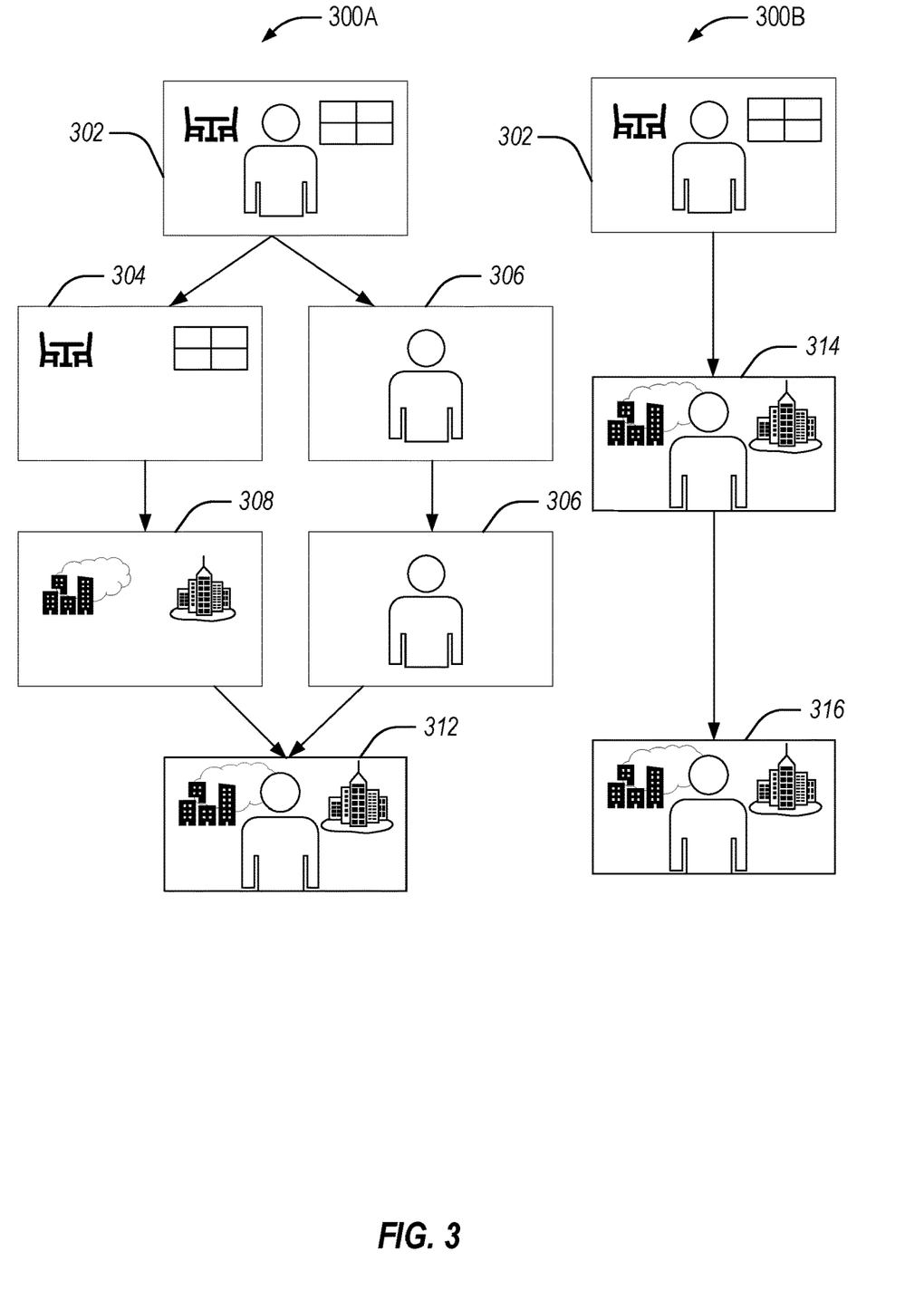
FIG. 3 illustrates an example technique for background replacement for an image or video according to some examples of the present disclosure.

FIG. 3 illustrates an example block diagram showing an authorized and unauthorized background replacement for an image or video according to some examples of the present disclosure. The authorized technique 300A includes capturing an image 302 (which may include a frame of a video stream), segmenting the video into a captured background portion 304 and a captured foreground portion 306. A virtual background portion 308 is then identified, and along with the previous segmented captured foreground portion 306, these portions are used to create a composite output image 312. The composite output image 312, when subjected to segmentation will identify the foreground portion 306 with a user and the background portion 308. Said another way, the previous step with the background portion 308 and the foreground portion 306 may be replicated from the composite output image 312.

The unauthorized technique 300B may include capturing the image 302 (or may omit this step), but then replacing the entire image 302 with a virtual background image 314 that includes the user. A composite output image 316 is generated, but does not include a foreground portion, since the entire image 302 was replaced with the virtual background image 314 instead of just a background portion of the image 302. Although the composite output image 312 and the composite output image 316 appear to be the same (e.g., to a viewer or user of an access control system), they differ when segmented. For example, when the composite output image 312 is segmented, the background portion 308 and the foreground portion 306 may be identified. However, when the composite output image 316 is segmented, the entire image (or substantially the entire image, subject to potential artifacts) appears to be background (or foreground, depending on the segmentation algorithm used). Thus, composite output image 316 may be differentiated from composite output image 312, to identify the unauthorized access attempt in technique 300B and the authorized access attempt in technique 300A, respectively.

Figure 4:
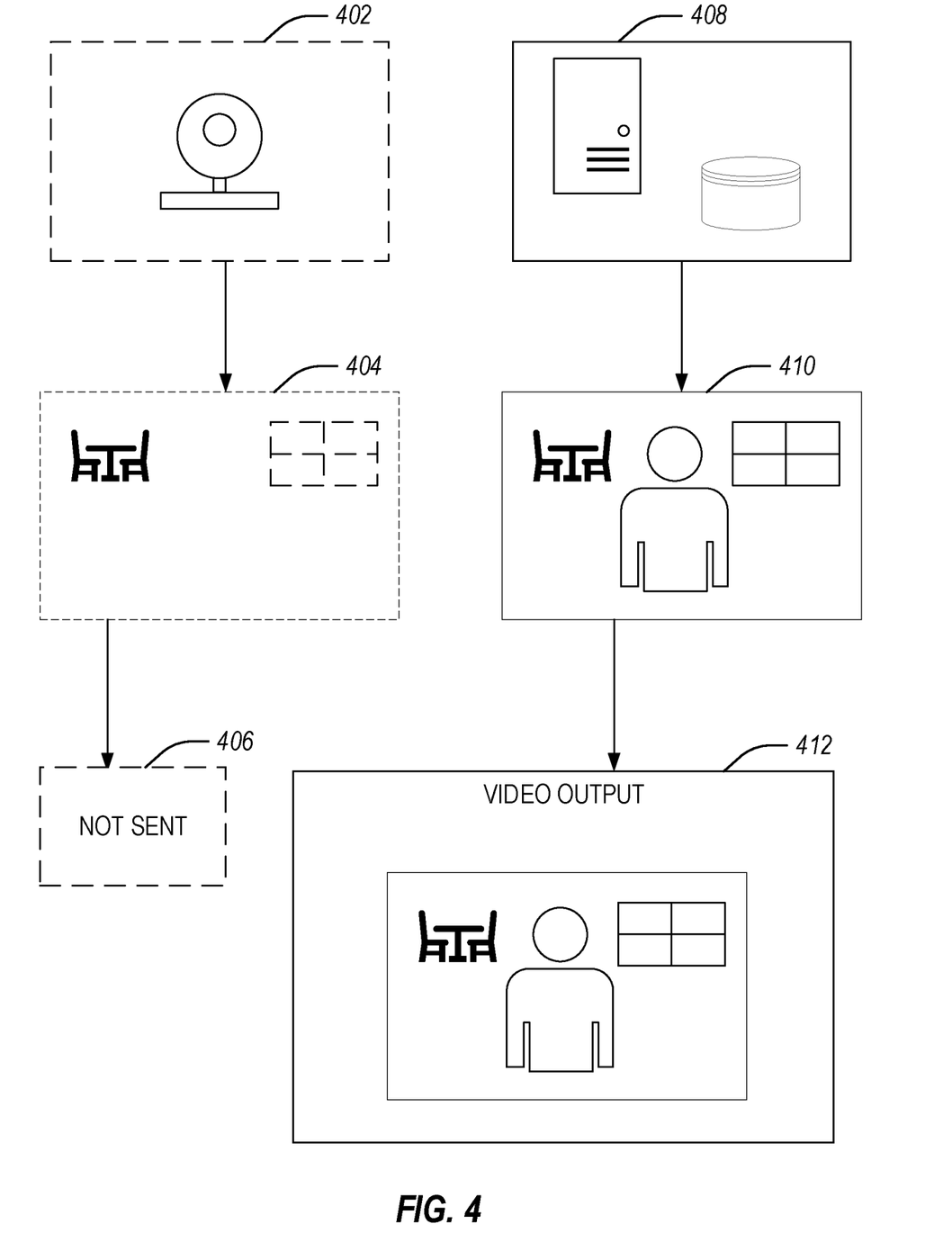
FIG. 4 illustrates an example technique for video or image replacement according to some examples of the present disclosure.

FIG. 4 illustrates an example block diagram showing an authorized and unauthorized video or image replacement according to some examples of the present disclosure. The authorized technique 400A includes capturing video or an image with a physical camera 402, and optionally replacing a background image 404, before outputting. However, in an unauthorized technique 400B, the captured video output is not sent 406. Instead, the unauthorized technique 400B includes accessing a pre-recorded image or video from a database or other storage device 408, optionally replacing captured video or a captured image with the pre-recorded video or image 410 (on other examples, the camera does not capture an image or video), and outputting the pre-recorded video or image 412.

The unauthorized technique 400B may be identified based on a source (e.g., camera 402 or storage device 408) as including a live or pre-recorded image or video. When the source is the camera 402 (which may include an embedded camera of a phone or computer, a camera accessed via a connection port, such as USB, or a remote camera), the image or video may be identified as live. When the source is a storage device 408 (or otherwise relies on a software source, such as a video playback application), the image or video may be identified as pre-recorded.

The source may be identified based on a source type (e.g., hardware or software, camera or storage device, or the like). The source type may be identified in metadata of the image or video. The source type may be identified from a connection type of the source (e.g., a physical connection port may correspond to a live image or video, and a software or internal connection may correspond to a pre-recorded image or video). The metadata may include driver information of the source, a camera name or a flag identifying the source, a connection type of the source. In an example, the video may be identified as live or pre-recorded based on a comparison of the source (e.g., identified in the metadata) to a list of allowed devices or connection types. When the source device or connection type is on the allowed list, the image or video may be identified as live (e.g., authorized). When the source device or connection type is not on the allowed list, the image or video may be identified as pre-recorded (e.g., unauthorized). In another example, instead of an allowed list, a ban list may be used with devices or connection types that appear on the ban list indicating that an image or video is pre-recorded. The source type may be identified based on a pattern of detected disk or processor activity.

Figure 5:
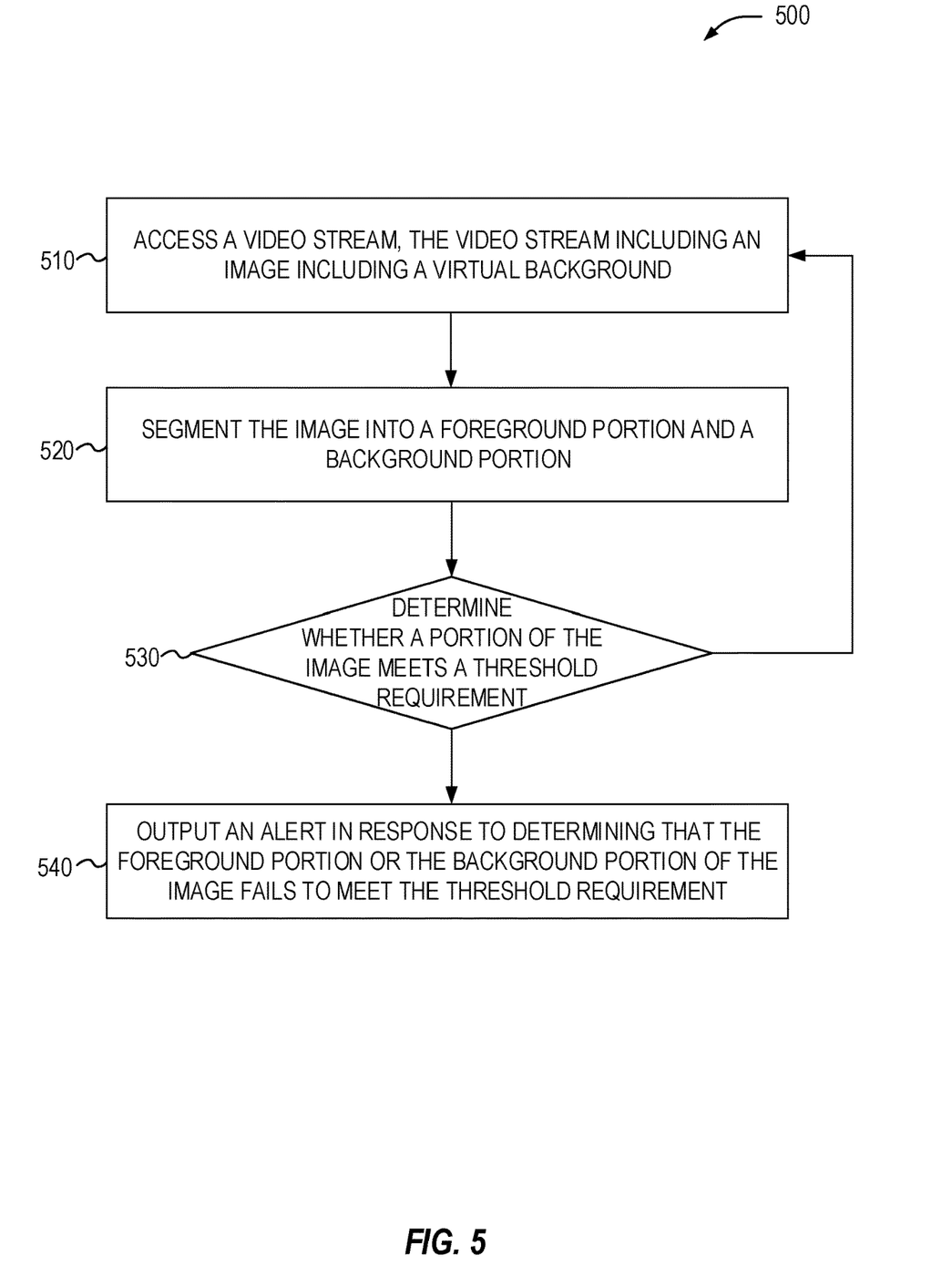
FIG. 5 illustrates a flowchart of a technique for detecting an image or video substantially without a foreground area according to some examples of the present disclosure.

FIG. 5 illustrates a flowchart of a technique for detecting an image or video substantially without a foreground area according to some examples of the present disclosure. The technique 500 may be performed using processing circuitry, such as a processor or processors of a device, such as a computer, a laptop, a mobile device or the like (e.g., as discussed in further detail below with respect to FIG. 7). For example, the technique 500 may be performed by a data processing system, such as a user device (e.g., a phone, a laptop, a desktop computer, etc.) or a server. The technique 500 may be used to prevent or alert about unauthorized access or use of an asset, such as a physical location (e.g., a room, a file cabinet, a safe, an area, etc.), a digital location (e.g., a website, a secure server, etc.), a service, data, or the like.

The technique 500 includes an operation 510 to access or provide a video stream, the video stream including an image including a virtual background. The video stream may be recorded or output during a live video conferencing session. The live video conferencing session may include an online video call, with a plurality of participants, including video or audio connections.

The technique 500 includes an operation 520 to segment the image into a foreground portion and a background portion. Segmenting the image may include using a segmentation technique of an application running a live video conference, the segmentation technique also used to apply the virtual background to the video stream for use in the live video conference. In an example, segmenting the image includes using a machine learning model, such as a deep learning model, neural network, etc. Operation 520 may include generating a segmentation mask including the foreground portion and the background portion.

The technique 500 includes a decision operation 530 to determine whether a portion of the image (e.g., the foreground portion or the background portion) meets a threshold requirement. When the portion of the image meets the threshold requirement, the technique 500 may return to operation 510 or may end. When the portion of the image fails to meet the threshold requirement, the technique 500 may proceed to operation 540. The threshold requirement may be associated with a classification of a pixel in the image. For example, pixels in the image may be classified into foreground or background pixels. The threshold requirement may correspond to a percentage, number, or sampling of pixels that are in a foreground or background portion of the image. For example, when 95% of pixels or pixels sampled in the image (sampling may occur randomly or according to a sampling scheme, such as one per four or sixteen square pixels in the image) are background pixels, the threshold requirement may fail to be met.

In an example, the technique 500 may include determining that a participant viewable in the video stream is looking away from a camera capturing the video stream, and in response to determining that the participant is looking away from the camera, turning off the camera.

The technique 500 includes an operation 540 to output an alert in response to determining that the foreground portion or the background portion of the image fails to meet the threshold requirement. The alert may indicate an unauthorized access or use. In an example, segmenting the image includes segmenting a plurality of images of the video stream, and the alert may be output in response to determining that respective foreground portions or background portions of at least a portion of the plurality of images fail to meet the threshold requirement. Operation 540 may include generating a warning indication on a user interface of a user device signifying that a participant associated with generating the video stream is not present within the live video conference. In an example, the alert may be provided for display on a tenant dashboard.

In response to determining that the portion of the image fails to meet the threshold requirement, the technique 500 may include an automated action.

The automated action may include activating a host configured automated service in response to determining that the foreground portion or the background portion of the image fails to meet the threshold requirement, the host configured automated service including at least one of an automated phone call, an automated text message, an automated email message, blocking incoming video at a user device, blocking outgoing video at a user device, prohibiting a voting input from a user device, preventing access to a secure physical location, preventing access to secure digital information, terminating access to secure digital information, rendering a different set of information for display, requiring additional information, or the like.

Figure 6:
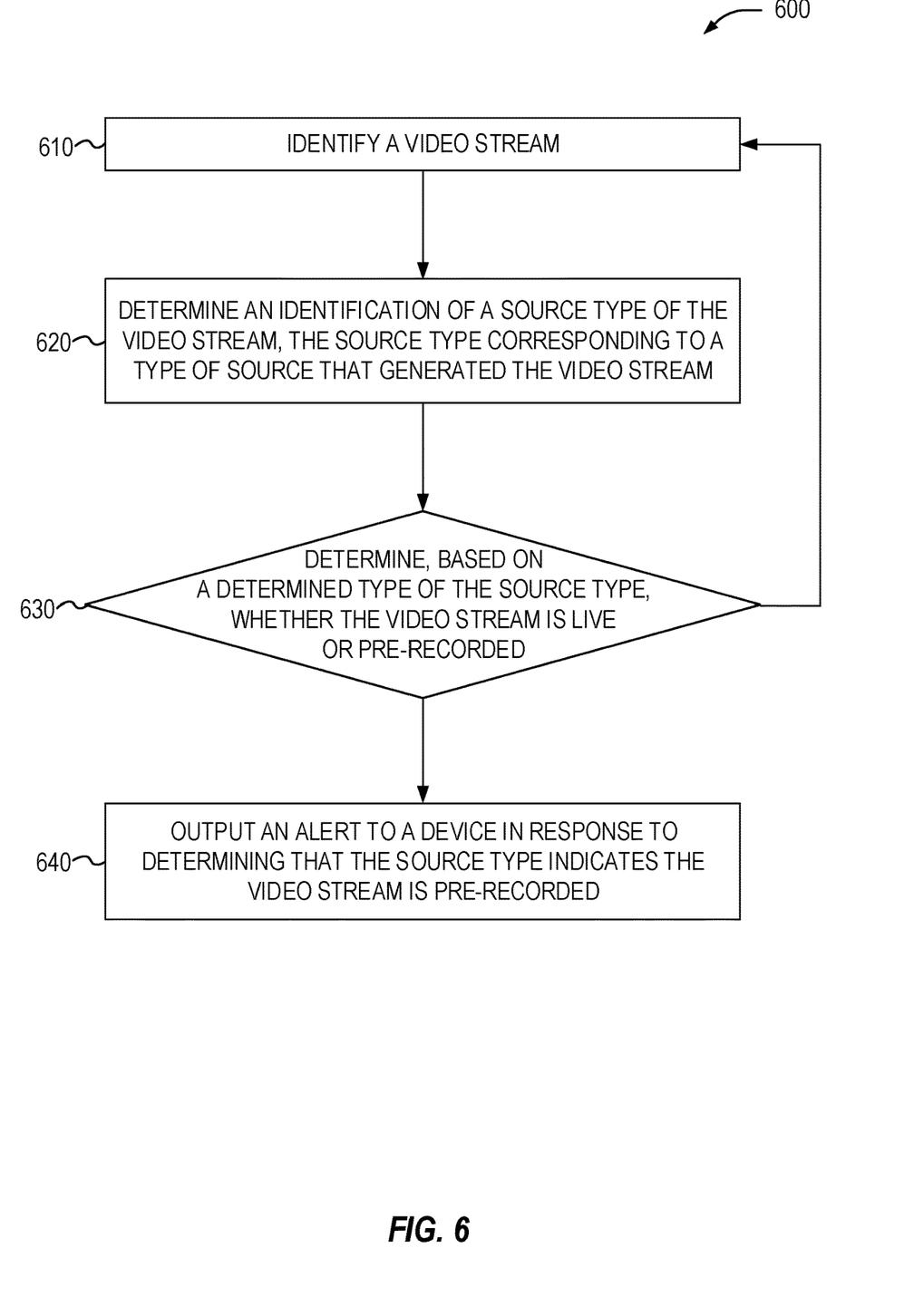
FIG. 6 illustrates a flowchart of a technique for detecting a pre-recorded image or video according to some examples of the present disclosure.

FIG. 6 illustrates a flowchart of a technique for detecting a pre-recorded image or video according to some examples of the present disclosure. The technique 600 may be performed using a processor or processors of a device, such as a computer, a laptop, a mobile device or the like (e.g., as discussed in further detail below with respect to FIG. 7). For example, the technique 600 may be performed by a data processing system, such as a user device (e.g., a phone, a laptop, a desktop computer, etc.) or a server. The technique 600 may be used to prevent or alert about unauthorized access or use of an asset, such as a physical location (e.g., a room, a file cabinet, a safe, an area, etc.), a digital location (e.g., a website, a secure server, etc.), a service, data, or the like.

The technique 600 includes an operation 610 to identify a video stream. Identifying the video stream may include accessing or providing the video stream. The video stream may be recorded or output during a live video conferencing session. The live video conferencing session may include an online video call, with a plurality of participants, including video or audio connections. In other examples, the video stream may be used with a security access requirement system.

The technique 600 includes an operation 620 to determine an identification of a source type of the video stream, the source type corresponding to a type of source that generated the video stream. The identification may be based on information extracted from metadata associated with the video stream. In an example, the source type may indicate that the video stream is live when the source type corresponds to a camera, and the source type indicates that the video stream is pre-recorded when the source type corresponds to a video playback application. The source type identification may be determined based on at least one of driver information in the metadata of the video stream, a camera name or a flag in the metadata of the video stream, a connection type of the source, by comparing the information extracted from the metadata to a list of allowed devices, or the like.

The technique 600 includes a decision operation 630 to determine, based on a determined type of the source type, whether the video stream is live or pre-recorded. When the determined type of the source type indicates that the video stream is live, the technique 600 may return to operation 610 or may end. When the determined type of the source type indicates that the video stream is pre-recorded, the technique 600 may proceed to operation 640. In an example, the video stream may be determined to be live when connection type of the source is a physical connection port (e.g., via a USB connection, an HDMI connection, etc.).

The technique 600 includes an operation 640 to output an alert to a device in response to determining that the source type indicates the video stream is pre-recorded. The device provided the alert may include a host device of a live video conferencing session, a tenant dashboard, a server, a service, or the like. The alert may indicate an unauthorized access or use. In an example, the technique 600 may include determining that a participant viewable in the video stream is looking away from a camera capturing the video stream, and in response to determining that the participant is looking away from the camera, turning off the camera.

Operation 640 may include generating a warning indication on a user interface of a user device. The warning indication may signify that the video stream is pre-recorded. In another example, the warning indication may signify that a participant associated with generating the video stream is not present within the live video conference.

In response to determining that the portion of the image fails to meet the threshold requirement, the technique 600 may include an automated action. The automated action may include activating a host configured automated service in response to determining that the foreground portion or the background portion of the image fails to meet the threshold requirement, the host configured automated service including at least one of an automated phone call, an automated text message, an automated email message, blocking incoming video at a user device, blocking outgoing video at a user device, prohibiting a voting input from a user device, preventing access to a secure physical location, preventing access to secure digital information, terminating access to secure digital information, rendering a different set of information for display, requiring additional information, or the like.

Figure 7:
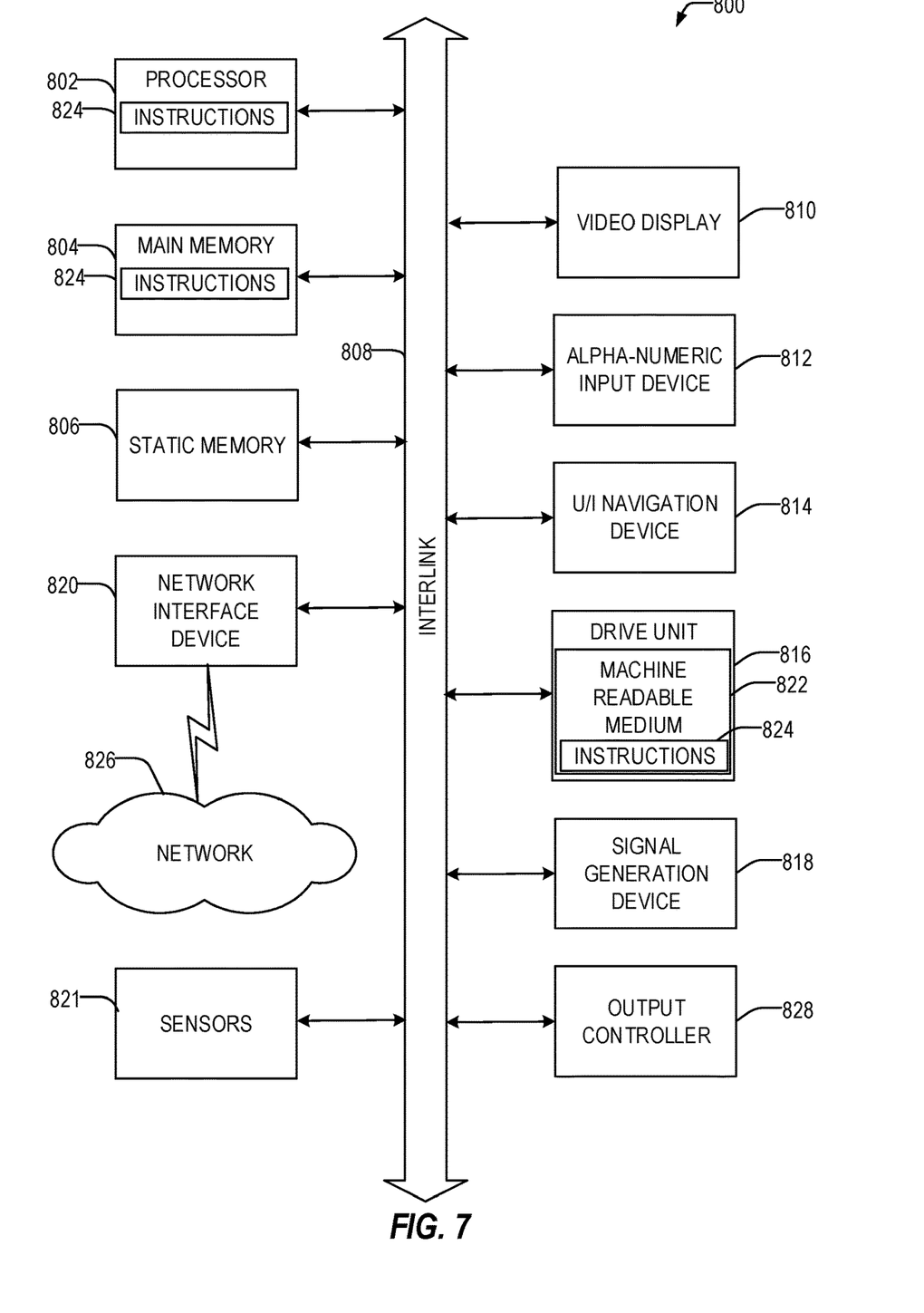
FIG. 7 illustrates a block diagram of an example machine which may implement one or more of the techniques discussed herein according to some examples of the present disclosure.

FIG. 7 illustrates a block diagram of an example machine 700 which may implement one or more of the techniques (e.g., methodologies) discussed herein according to some examples of the present disclosure. In alternative embodiments, the machine 700 may operate as a standalone device or may be connected (e.g., networked) to other machines. In a networked deployment, the machine 700 may operate in the capacity of a server machine, a client machine, or both in server-client network environments. The machine 700 may be configured to perform the methods of FIG. 5 or 6. The machine 700 may be configured to provide the user interfaces of FIG. 1 or 2. In an example, the machine 700 may act as a peer machine in peer-to-peer (P2P) (or other distributed) network environment. The machine 700 may be a user device, a remote device, a second remote device or other device which may take the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB)), parallel, or other wired or wireless (e.g., infrared (IR), near field communication (NFC), High-Definition Multimedia Interface (HDMI), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Nonlimiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may be non-transitory machine-readable media. In some examples, machine readable media may include machine readable media that is not a transitory propagating signal.

The instructions 724 may further be transmitted or received over a communications network 726 using a transmission medium via the network interface device 720. The machine 700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

Example 1 is a method performed by a data processing system comprising: accessing, using processing circuitry of the data processing system, a video stream, the video stream including an image including a virtual background; segmenting the image into a foreground portion and a background portion to determine whether the foreground portion or the background portion of the image meets a threshold requirement, the threshold requirement associated with classifications of pixels in the image; and outputting an alert in response to determining that the foreground portion or the background portion of the image fails to meet the threshold requirement, the alert indicating an unauthorized access or use.

In Example 2, the subject matter of Example 1 includes, wherein segmenting the image includes using a segmentation technique of an application running a live video conference, the segmentation technique also used to apply the virtual background to the video stream for use in the live video conference.

In Example 3, the subject matter of Examples 1-2 includes, wherein segmenting the image includes using a deep learning model.

In Example 4, the subject matter of Examples 1-3 includes, wherein segmenting the image includes determining that a participant viewable in the video stream is looking away from a camera capturing the video stream, and in response to determining that the participant is looking away from the camera, turning off the camera.

In Example 5, the subject matter of Examples 1-4 includes, wherein segmenting the image includes generating a segmentation mask including the foreground portion and the background portion.

In Example 6, the subject matter of Examples 1-5 includes, wherein segmenting the image includes segmenting a plurality of images of the video stream, and wherein the alert is output in response to determining that respective foreground portions or background portions of at least a portion of the plurality of images fail to meet the threshold requirement.

In Example 7, the subject matter of Examples 1-6 includes, wherein outputting the alert includes generating a warning indication on a user interface of a user device signifying that a participant associated with generating the video stream is not present within the live video conference.

In Example 8, the subject matter of Examples 1-7 includes, activating a host configured automated service in response to determining that the foreground portion or the background portion of the image fails to meet the threshold requirement, the host configured automated service including at least one of an automated phone call, an automated text message, an automated email message, blocking incoming video at a user device, blocking outgoing video at a user device, prohibiting a voting input from a user device, preventing access to a secure physical location, preventing access to secure digital information, terminating access to secure digital information, rendering a different set of information for display, or requiring additional information.

In Example 9, the subject matter of Examples 1-8 includes, wherein outputting the alert includes providing the alert for display on a tenant dashboard.

In Example 10, the subject matter of Examples 1-9 includes, wherein the video stream is recorded and output during a live video conferencing session.

Example 11 is a data processing system comprising: processing circuitry; and memory, including instructions, which when executed by the processing circuitry, cause the processing circuitry to perform operations to: access a video stream, the video stream including an image including a virtual background; segment the image into a foreground portion and a background portion to determine whether the foreground portion or the background portion of the image meets a threshold requirement, the threshold requirement associated with classifications of pixels in the image; and output an alert in response to the determination that the foreground portion or the background portion of the image fails to meet the threshold requirement, the alert indicating an unauthorized access or use.

In Example 12, the subject matter of Example 11 includes, wherein to segment the image, the processing circuitry is further caused to use a segmentation technique of an application running a live video conference, the segmentation technique also used to apply the virtual background to the video stream for use in the live video conference.

In Example 13, the subject matter of Examples 11-12 includes, wherein to segment the image, the processing circuitry is further caused to use a deep learning model.

In Example 14, the subject matter of Examples 11-13 includes, wherein to segment the image, the processing circuitry is further caused to determine that a participant viewable in the video stream is looking away from a camera capturing the video stream, and in response to the determination that the participant is looking away from the camera, turn off the camera.

In Example 15, the subject matter of Examples 11-14 includes, wherein to segment the image, the processing circuitry is further caused to generate a segmentation mask including the foreground portion and the background portion.

In Example 16, the subject matter of Examples 11-15 includes, wherein to segment the image, the processing circuitry is further caused to segment a plurality of images of the video stream, and wherein the alert is output in response to a determination that respective foreground portions or background portions of at least a portion of the plurality of images fail to meet the threshold requirement.

In Example 17, the subject matter of Examples 11-16 includes, wherein to output the alert, the processing circuitry is further caused to generate a warning indication on a user interface of a user device signifying that a participant associated with generating the video stream is not present within the live video conference.

In Example 18, the subject matter of Examples 11-17 includes, wherein the processing circuitry is further caused to activate a host configured automated service in response to the determination that the foreground portion or the background portion of the image fails to meet the threshold requirement, the host configured automated service including at least one of an automated phone call, an automated text message, an automated email message, blocking incoming video at a user device, blocking outgoing video at a user device, prohibiting a voting input from a user device, preventing access to a secure physical location, preventing access to secure digital information, terminating access to secure digital information, rendering a different set of information for display, or requiring additional information.

In Example 19, the subject matter of Examples 11-18 includes, wherein to output the alert, the processing circuitry is further caused to provide the alert for display on a tenant dashboard.

In Example 20, the subject matter of Examples 11-19 includes, wherein the video stream is recorded and output during a live video conferencing session.

Example 21 is a method performed by a data processing system comprising: identifying a video stream; determining, using processing circuitry of the data processing system, an identification of a source type of the video stream based on information extracted from metadata associated with the video stream, the source type corresponding to a type of source that generated the video stream; determining, using the processing circuitry of the processing system, based on a determined type of the source type, whether the video stream is live or pre-recorded; and outputting an alert to a device in response to determining that the source type indicates the video stream is pre-recorded, the alert indicating an unauthorized access or use.

In Example 22, the subject matter of Example 21 includes, wherein the source type indicates that the video stream is live when the source type corresponds to a camera, and the source type indicates that the video stream is pre-recorded when the source type corresponds to a video playback application.

In Example 23, the subject matter of Examples 21-22 includes, wherein outputting the alert includes generating a warning indication on a user interface of a user device signifying that the video stream is pre-recorded.

In Example 24, the subject matter of Examples 21-23 includes, activating a host configured automated service in response to determining that the video is pre-recorded, the host configured automated service including at least one of an automated phone call, an automated text message, an automated email message, blocking incoming video at a user device, blocking outgoing video at a user device, prohibiting a voting input from a user device, preventing access to a secure physical location, preventing access to secure digital information, terminating access to secure digital information, rendering a different set of information for display, or requiring additional information.

In Example 25, the subject matter of Examples 21-24 includes, wherein outputting the alert includes providing the alert for display on a tenant dashboard.

In Example 26, the subject matter of Examples 21-25 includes, wherein the video stream is output during a live video conferencing session.

In Example 27, the subject matter of Examples 21-26 includes, wherein the source type identification is determined based on at least one of driver information in the metadata of the video stream, a camera name or a flag in the metadata of the video stream, a connection type of the source, or by comparing the information extracted from the metadata to a list of allowed devices.

In Example 28, the subject matter of Example 27 includes, wherein the video stream is determined to be live when the connection type of the source is a physical connection port.

In Example 29, the subject matter of Examples 21-28 includes, wherein the data processing system includes a user device to generate the video stream, and wherein the device receiving the alert is a device remote to the user device.

Example 30 is at least one machine-readable medium including instructions for operation of a computing system, which when executed by a machine, cause the machine to perform operations of any of the methods of Examples 21-29.

Example 31 is an apparatus comprising means for performing any of the methods of Examples 21-29.

Example 32 is a data processing system comprising: processing circuitry; and memory, including instructions, which when executed by the processing circuitry, cause the processing circuitry to perform operations to: identify a video stream; determine, using processing circuitry of the data processing system, an identification of a source type of the video stream based on information extracted from metadata associated with the video stream, the source type corresponding to a type of source that generated the video stream; determine, using the processing circuitry of the processing system, based on a determined type of the source type, whether the video stream is live or pre-recorded; and output an alert to a device in response to determining that the source type indicates the video stream is pre-recorded, the alert indicating an unauthorized access or use.

In Example 33, the subject matter of Example 32 includes, wherein the source type indicates that the video stream is live when the source type corresponds to a camera, and the source type indicates that the video stream is pre-recorded when the source type corresponds to a video playback application.

In Example 34, the subject matter of Examples 32-33 includes, wherein to output the alert, the processing circuitry is further caused to generate a warning indication on a user interface of a user device signifying that the video stream is pre-recorded.

In Example 35, the subject matter of Examples 32-34 includes, wherein the processing circuitry is further caused to activate a host configured automated service in response to the determination that the video is pre-recorded, the host configured automated service including at least one of an automated phone call, an automated text message, an automated email message, blocking incoming video at a user device, blocking outgoing video at a user device, prohibiting a voting input from a user device, preventing access to a secure physical location, preventing access to secure digital information, terminating access to secure digital information, rendering a different set of information for display, or requiring additional information.

In Example 36, the subject matter of Examples 32-35 includes, wherein to output the alert, the processing circuitry is further caused to provide the alert for display on a tenant dashboard.

In Example 37, the subject matter of Examples 32-36 includes, wherein the video stream is output during a live video conferencing session.

In Example 38, the subject matter of Examples 32-37 includes, wherein the source type identification is determined based on at least one of driver information in the metadata of the video stream, a camera name or a flag in the metadata of the video stream, a connection type of the source, or by comparing the information extracted from the metadata to a list of allowed devices.

In Example 39, the subject matter of Example 38 includes, wherein the video stream is determined to be live when the connection type of the source is a physical connection port.

In Example 40, the subject matter of Examples 32-39 includes, wherein the data processing system includes a user device to generate the video stream, and wherein the device that receives the alert is a device remote to the user device.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

What is claimed is:

1. A method performed by a data processing system to determine if a live user is present or if an image of a person in a video stream is a pre-recorded virtual background, the method comprising:
   accessing, using processing circuitry of the data processing system, the video stream, the video stream including an image including a virtual background, the virtual background a digitally inserted and artificial backdrop that is used in place of the actual physical background captured by a camera during the video stream;
   segmenting the image into a foreground portion and a background portion;
   determining whether the foreground portion or the background portion of the image meets a threshold requirement, the threshold requirement corresponding to a percentage, number or sampling of pixels that are in the foreground or background portion of the image; and
   outputting an alert in response to determining that the foreground portion or the background portion of the image fails to meet the threshold requirement, the alert indicating that the person in the video stream is the pre-recorded virtual background.

2. The method of claim 1, wherein segmenting the image includes using a segmentation technique of an application running a live video conference.

3. The method of claim 1, wherein segmenting the image includes using a deep learning model.

4. The method of claim 1, wherein segmenting the image includes determining that a participant viewable in the video stream is looking away from a camera capturing the video stream, and in response to determining that the participant is looking away from the camera, turning off the camera.

5. The method of claim 1, wherein segmenting the image includes generating a segmentation mask including the foreground portion and the background portion.

6. The method of claim 1, wherein segmenting the image includes segmenting a plurality of images of the video stream, and wherein the alert is output in response to determining that respective foreground portions or background portions of at least a portion of the plurality of images fail to meet the threshold requirement.

7. The method of claim 1, wherein outputting the alert includes generating a warning indication on a user interface of a user device signifying that a participant associated with generating the video stream is not present within a live video conference.

8. The method of claim 1, further comprising activating a host configured automated service in response to determining that the foreground portion or the background portion of the image fails to meet the threshold requirement, the host configured automated service including at least one of an automated phone can, an automated text message, an automated email message, blocking incoming video at a user device, blocking outgoing video at a user device, prohibiting a voting input from a user device, preventing access to a secure physical location, preventing access to secure digital information, terminating access to secure digital information, rendering a different set of information for display, or requiring additional information.

9. The method of claim 1, wherein outputting the alert includes providing the alert for display on a tenant dashboard.

10. The method of claim 1, wherein the video stream is output during a live video conferencing session.

11. A data processing system for determining if a live user is present or if an image of a person in a video stream is a pre-recorded virtual background, the data processing system comprising:
   processing circuitry; and
   memory, including instructions, which when executed by the processing circuitry, cause the processing circuitry to perform operations to:
   access the video stream, the video stream including an image including a virtual background, the virtual background a digitally inserted and artificial backdrop that is used in place of the actual physical background captured by a camera during the video stream;
   segment the image into a foreground portion and a background portion;
   determine whether the foreground portion or the background portion of the image meets a threshold requirement, the threshold requirement corresponding to a percentage, number or sampling of pixels that are in the foreground or background portion of the image; and
   output an alert in response to the determination that the foreground portion or the background portion of the image fails to meet the threshold requirement, the alert indicating that the person in the video stream is the pre-recorded virtual background.

12. The data processing system of claim 11, wherein to segment the image, the processing circuitry is further caused to use a segmentation technique of an application running a live video conference, the segmentation technique also used to apply the virtual background to the video stream for use in the live video conference.

13. The data processing system of claim 11, wherein to segment the image, the processing circuitry is further caused to use a deep learning model.

14. The data processing system of claim 11, wherein to segment the image, the processing circuitry is further caused to determine that a participant viewable in the video stream is looking away from a camera capturing the video stream, and in response to the determination that the participant is looking away from the camera, turn off the camera.

15. The data processing system of claim 11, wherein to segment the image, the processing circuitry is further caused to generate a segmentation mask including the foreground portion and the background portion.

16. A machine-readable storage device, storing instructions to determine if a live user is present or if an image of a person in a video stream is a pre-recorded virtual background, the instructions, when executed by a data processing system, causes the data processing system to perform operations comprising:
- accessing, using processing circuitry of the data processing system, the video stream, the video stream including an image including a virtual background, the virtual background a digitally inserted and artificial backdrop that is used in place of the actual physical background captured by a camera during the video stream;
- segmenting the image into a foreground portion and a background portion;
- determining whether the foreground portion or the background portion of the image meets a threshold requirement, the threshold requirement corresponding to a percentage, number or sampling of pixels that are in the foreground or background portion of the image; and
- outputting an alert in response to determining that the foreground portion or the background portion of the image fails to meet the threshold requirement, the alert indicating that the person in the video stream is the pre-recorded virtual background.

17. The machine-readable storage device of claim 16, wherein the operations of segmenting the image includes using a segmentation technique of an application running a live video conference.

18. The machine-readable storage device of claim 16, wherein the operations of segmenting the image includes using a deep learning model.

19. The machine-readable storage device of claim 16, wherein the operations of segmenting the image includes determining that a participant viewable in the video stream is looking away from a camera capturing the video stream, and in response to determining that the participant is looking away from the camera, turning off the camera.

20. The machine-readable storage device of claim 16, wherein the operations of segmenting the image includes generating a segmentation mask including the foreground portion and the background portion.

* * * * *